United States Patent [19]
Gritter et al.

[11] 3,982,170
[45] Sept. 21, 1976

[54] VARIABLE SPEED, CONSTANT FREQUENCY INDUCTION GENERATOR SYSTEM

[75] Inventors: David James Gritter, Elmhurst; George Henry Studtmann, Mount Prospect, both of Ill.

[73] Assignee: Borg-Warner Corporation, Chicago, Ill.

[22] Filed: Nov. 28, 1975

[21] Appl. No.: 636,331

[52] U.S. Cl. .................................. 322/47; 322/32; 322/94
[51] Int. Cl.² ......................................... H02P 9/00
[58] Field of Search .................. 322/47, 28, 20, 72, 322/94, 61, 32, 29; 321/45 C, 5

[56] References Cited
UNITED STATES PATENTS

| | | | |
|---|---|---|---|
| 3,829,758 | 8/1974 | Studtmann | 322/47 |
| 3,832,625 | 8/1974 | Gyugi | 322/47 |

Primary Examiner—J D Miller
Assistant Examiner—Robert J. Hickey
Attorney, Agent, or Firm—James J. Jennings, Jr.

[57] ABSTRACT

The disclosed voltage generating system includes certain known components, such as an induction machine driven as a generator, the output connections of which are coupled to the normal load connections of a switching system, which can be a bridge-type inverter. The system switching frequency $f_1$ is regulated by firing pulses from a logic circuit in turn controlled by an oscillator. By controlling operation of the inverter switches with respect to the synchronous frequency (mechanical rotational speed) of the machine, a d-c voltage is provided on the normal inverter bus conductors.

In the disclosed system the conventional inverter switches (such as SCR's) are replaced by true two-way power switches, capable of passing current in either direction. In addition the firing signals provided by the usual logic circuit and applied to these power switches are modified so that the switching occurs as a function not only of the first oscillator frequency $f_1$ but also of signals received from a second oscillator at a frequency $f_2$. In brief, the switching is accomplished with a gate circuit including an exclusive OR arrangement, fed by both the first and second oscillators, to produce an a-c output voltage on the inverter bus conductors. The frequency of this a-c output voltage is controllable independently of the generator speed, and the output voltage amplitude is controllable independently both of generator speed and load variations.

By using an induction machine with multiple windings, and plural switching systems, multi-phase voltages can be supplied over multiple conductors to energize an a-c load.

12 Claims, 15 Drawing Figures

FIG. 2a
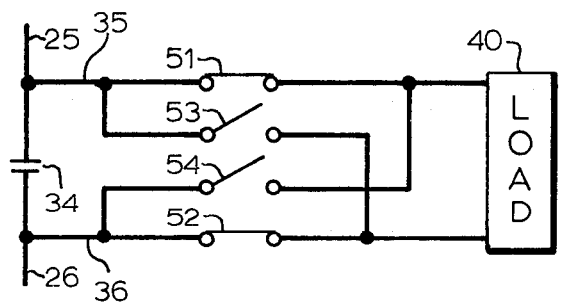
FIG. 2b
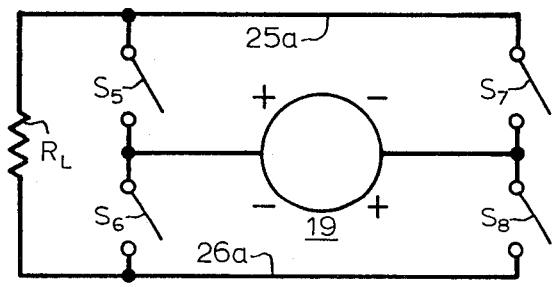
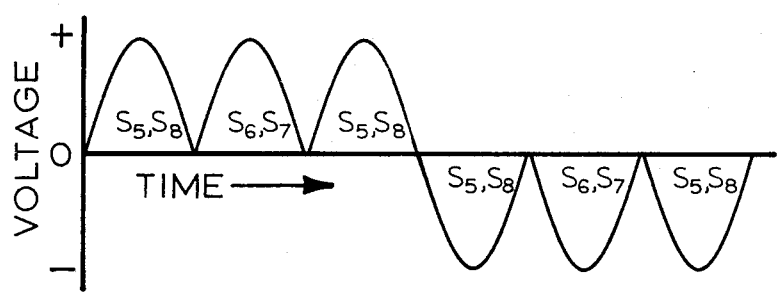
FIG. 2c
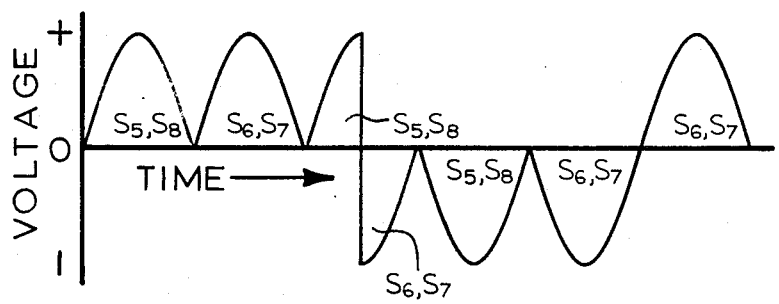
FIG. 2d
FIG. 2e
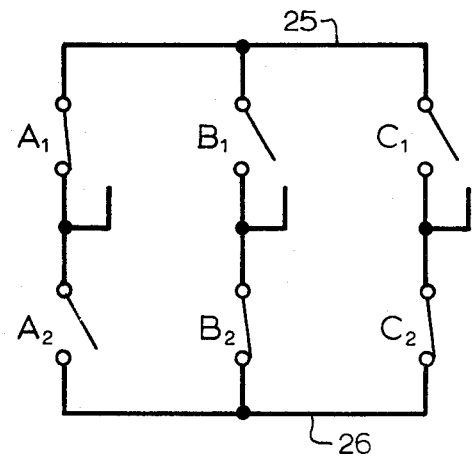
FIG. 2f
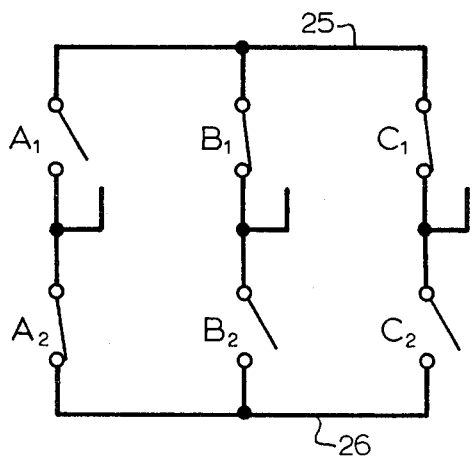

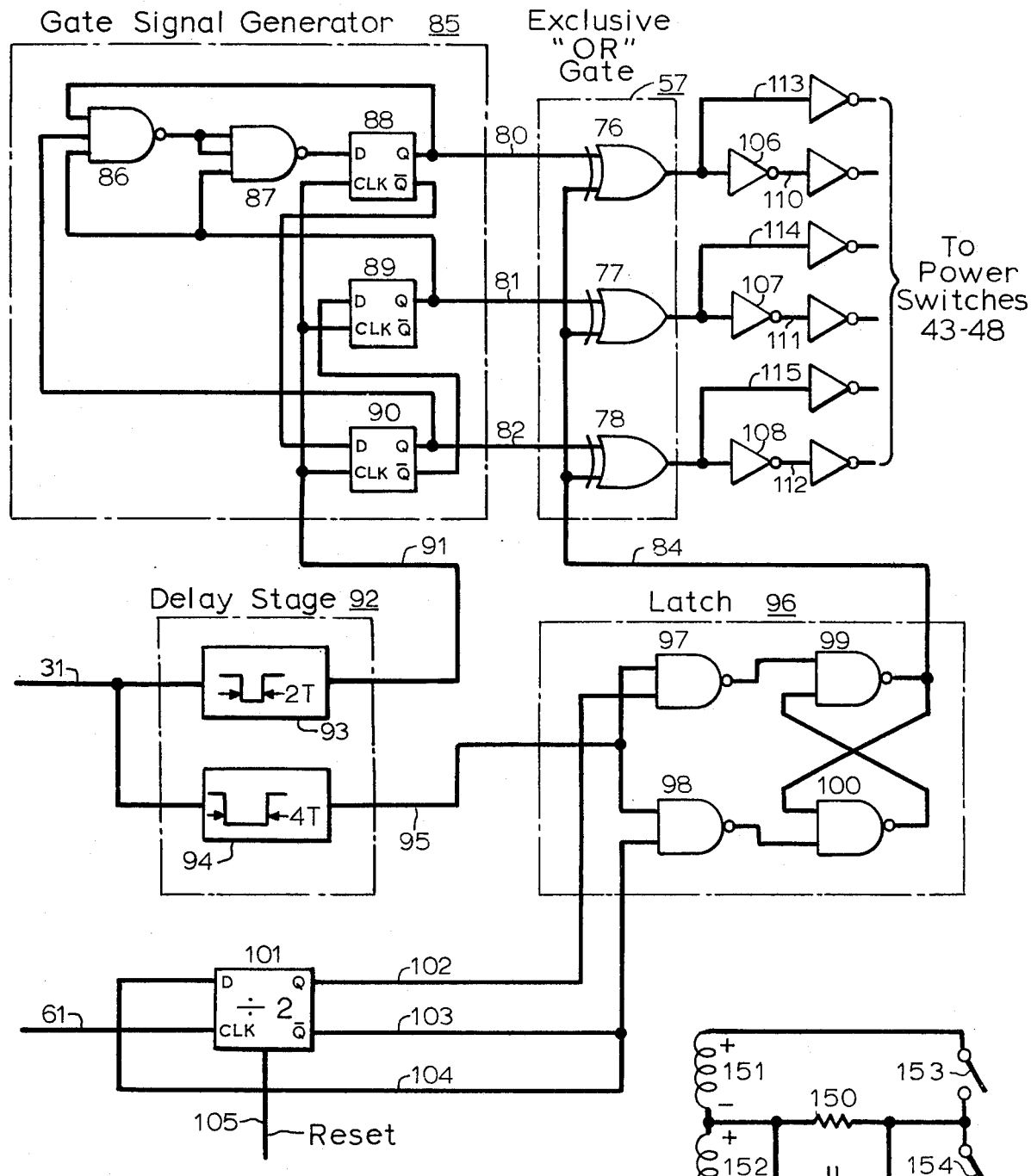

VARIABLE SPEED, CONSTANT FREQUENCY INDUCTION GENERATOR SYSTEM

BACKGROUND OF THE INVENTION

Recently considerable work has been directed to the use of the rugged induction machine as a generator, with its excitation supplied not by conventional means but a switching system resembling a conventional inverter circuit. Such an arrangement is described and claimed in U.S. Pat. No. 3,829,758-Studtmann, entitled "AC-DC Generating System," which issued Aug. 13, 1974, and is assigned to the assignee of this invention. FIG. 6 of that patent shows an arrangement in which a switching system, resembling an inverter circuit, supplies the excitation for an induction machine, without any necessity for a capacitor bank, additional machine or other external excitation arrangement. That arrangement provided both a d-c output voltage on the normal inverter bus conductors, and an a-c output voltage from the induction machine connections. As noted in that patent, the frequency of the generator voltage was essentially proportional to generator speed, deviating only by an amount equal to the slip frequency. To obtain a constant or controlled output frequency independent of shaft speed, generally termed a variable speed, constant frequency (VSCF) system, the inverter switching frequency can be modulated as disclosed and claimed in the application entitled "Modulated Induction Generator," Ser. No. 568,746, filed Apr. 16, 1975, which is assigned to the assignee of this invention. That system provides an a-c output voltage at a frequency which is independent of shaft speed, but this frequency must be substantially lower than the generator operating frequency. In some systems, this can be a significant drawback as the required generator frequency can become very high, leading to possible inefficient operation. In addition, that system results in modulation of the entire magnetic field of the machine, so that production of multiphase outputs requires the use of isolated magnetic circuits. For example, to achieve a three phase output, three isolated magnetic circuits or three machines would be required. This may result in a size and weight penalty. Thus the purpose of the present invention is to obviate the two major problems just described.

It is therefore a primary object of this invention to provide a generating system, the output voltage of which alternates at a frequency independent of the generator frequency, and which in fact may be above or below the generator frequency.

A further object of this invention is to provide a system in which the magnetic field of the machine remains built up, so that multiphase outputs can be obtained from one conventional three-phase machine.

A more specific object of this invention is to provide a logic circuit for effecting the precise operation of the switching system to produce the a-c output voltage for use with a-c loads.

SUMMARY OF THE INVENTION

Broadly the invention comprises controlling an a-c voltage generator system, in which an induction machine is driven as a generator and in which the machine is excited from a switching system having a plurality of controllable switches and a pair of bus conductors. The frequency of operation of the switches is regulated in accordance with a first frequency $f_1$ to regulate the amplitude of a d-c voltage established on the bus conductors.

Particularly in accordance with the invention, the system switches are additionally operated to switch in accordance with a second frequency $f_2$ and in a pattern such that the output voltage on the bus conductors is effectively reversed each time the switches are operated at the frequency $f_2$. This provides on the bus conductors an alternating voltage, the frequency of which is controllable independently of the induction generator speed, and the amplitude of which is controllable independently both of the induction generator speed and load variations.

The invention can be implemented by providing a switching system achieved by modifying the known inverter circuits so that each of the switches or thyristors is replaced by a power switch, capable of passing current in either direction when turned on by a firing pulse and also capable of being turned off at any time. Such a power switch can be composed of inverse-parallel connected thyristors, transistors, gate turn-off devices (GTO's), or a single triac, with commutation circuits where needed. Alternatively the power switch can be a single thyristor, transistor, or GTO device in a diode bridge configuration; again, commutation circuits are supplied where needed.

Such a switching system is generally regulated by a first logic circuit, operating at a frequency $f_1$. In accordance with the present invention, the system also includes a second logic circuit operating at a frequency $f_2$. This second logic circuit has a gate circuit coupled between the first (conventional) logic circuit and the power switches in the inverter circuit. A second oscillator circuit is provided and also coupled to the same gate circuit. Thus the gate circuit operation is regulated as a function of the pulses provided by both the first oscillator at a frequency $f_1$ and by the second oscillator at the frequency $f_2$. The first oscillator controls the system switching at frequency $f_1$ and this provides control of the generator voltage amplitude. The second oscillator causes phase reversal of the basic switching frequency $f_1$ at the second frequency $f_2$ and thus the frequency $f_2$ determines the output frequency of the voltage produced on the system bus conductors.

THE DRAWINGS

In the several figures of the drawings, like reference numerals identify like components, and in those drawings:

FIGS. 2a-2f are simplified illustrations useful in explaining the present invention;

FIG. 5 is a schematic diagram of the logic arrangement of this invention;

FIG. 6 is a partial schematic diagram showing a switching system for use in the system of this invention.

GENERAL DESCRIPTION

Figure 1:
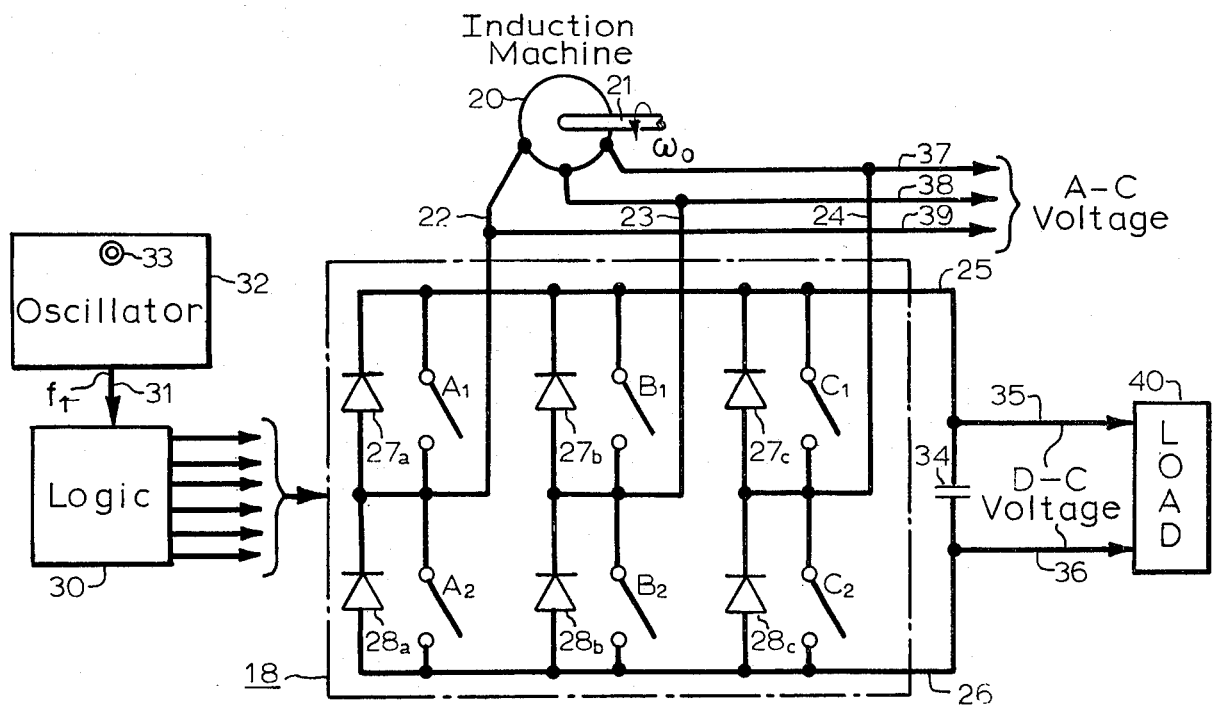
FIG. 1 is a block diagram of a known induction generator-inverter system.

The system arrangement of FIG. 1 corresponds generally to that of FIG. 6 in the above-identified U.S. Pat.

No. 3,829,758. As shown in FIG. 1, an induction machine 20 is driven over an input shaft 21 at some rotational frequency $\omega_o$ and is connected over its output connections and conductors 22, 23 and 24 to a switching system 18, which can be similar to a conventional inverter circuit with a pair of bus conductors 25, 26, six individual switches designated $A_1$-$C_2$, and a pair of diodes such as 27a, 28a connected in each phase circuit to facilitate the return of energy or allow the flow of reactive current when the switches $A_1$-$C_2$ are turned off. Although shown as simple mechanical switches, switches $A_1$-$C_2$ are generally thyristors, such as SCR's or other known powerhandling semiconductors, for passing current flow in one direction when triggered on by a gate signal. The commutation circuits for switches $A_1$-$C_2$ are not shown, as they are well known and understood in this art. The gate signals are received from a logic circuit 30, which can be a conventional ring counter as well known and understood in this art, in its turn controlled by timing pulses received over conductor 31 from an oscillator 32, having an adjustable component 33 (such as a knob to regulate the physical position of a potentiometer wiper arm) for controlling the frequency of the timing pulses supplied to the logic circuit, and thus of the switching frequency of the system 18. A capacitor 34 is coupled between the bus conductors 25, 26 as shown. With this arrangement, by regulating switching frequency of the switches within system 18 in relation to the mechanical drive frequency $\omega_o$, an a-c voltage was provided on the output conductors 37-39 and a d-c voltage supplied over conductors 35, 36 to a d-c load 40.

Given the d-c voltage on conductors 35, 36 of FIG. 1, if it were possible to reverse the connections of the two output conductors so that load 40 "sees" the reversed polarity, an alternating voltage can be provided to the load. This is possible, in a more general sense, by simply connecting four switches such as $S_1$-$S_4$ shown in FIG. 2a. With a d-c voltage of one polarity across capacitor 34 and switches $S_1$, $S_2$ closed, then a voltage of that same polarity is applied to the load. With the polarity of the voltage across capacitor 34 remaining the same, and switches $S_1$, $S_2$ being opened and switches $S_3$, $S_4$ then closed, the polarity of the voltage passed to the load is reversed. Hence it is possible to provide a switching arrangement in which the d-c voltage established on the bus conductors is effectively reversed to energize the load with an effective a-c voltage. However it would be preferable if the voltage polarity reversal could be accomplished without switching the load currents, but rather in appropriate regulation of the turn-on and turn-off of switches $A_1$-$C_2$ in switching system 18. Accordingly a significant part of the analysis of known systems, such as that depicted in FIG. 1, and the deduction that the system switches $A_1$-$C_2$ can be operated not only at a first frequency $f_1$ to regulate the amplitude of the output voltage on conductors 35, 36, but also at a second frequency $f_2$ to deliver an alternating output voltage to the load.

To gain insight into the operation of the present invention it is helpful to first consider a system as shown in FIG. 2b. As there shown in single phase generator 19, assumed to be a solid sine wave source, is shown operating in conjunction with a single phase bridge inverter composed of true power switches $S_5$-$S_8$. If the switches are assumed to be synchronized with the generator voltage such that $S_5$ and $S_8$ close when the generator voltage has the polarity indicated by the polarity signs above the generator, and $S_6$ and $S_7$ close when the generator voltage has the polarity indicated by the lower polarity signs, then a rectified sine wave voltage will appear on the bus conductors 25a, 26a as shown by the first three half-cycles in FIG. 2c. If at the end of the third half-cycle, the synchronization is changed so that $S_5$ and $S_8$ close when the generator voltage has the polarity of the signs below the generator, and also $S_6$ and $S_7$ close when the voltage has the polarity of the signs above the generator, then the output voltage will appear as shown by the last three half-cycles of FIG. 2c. Thus in effect an a-c voltage has been produced across the load terminals. This a-c voltage has a fundamental frequency component, in this case, of one-third the generator voltage frequency. Of course it is possible to change the synchronization at a time other than the end of a half-cycle of generator voltage. FIG. 2d depicts the case where phase reversal occurs after a time period equal to 2½ cycles of the source frequency. Thus by reversing the phase of the switching sequence at a rate $f_2$, the source voltage of frequency $f_1$ is made to appear across the load at a frequency $f_2$.

This system may be used in conjunction with the induction generator system by regulating the basic operating frequency $f_1$ of the inverter to sustain generator operation as in the system previously described in connection with FIG. 1, and then providing an additional oscillator and logic circuit to cause the phase reversal to occur at the desired output frequency $f_2$. If the basic switching system is a three-phase inverter, then the load would in effect see a switched d-c voltage level and hence a square wave of output voltage. If pulse width modulation (PWM) techniques are used to cause the phase reversal, then the output wave form can be shaped and controlled as is commonly known in that art.

The basic switching technique may be comprehended in connection with simplified figures such as FIGS. 2e and 2f. Let it be assumed that the system switches are in the positions depicted in FIG. 2e, with switches $A_1$, $B_2$ and $C_2$ closed, and the other switches open as shown. The switches were placed in these closed and open positions in accordance with signals from logic circuit 30, as a function of timing signals at a frequency $f_1$ to establish the amplitude of the d-c potential on conductors 25, 26. If, before another pulse issues at the frequency $f_1$ to effect a change in the switch positions, the switches can somehow be displaced so that the switches closed in FIG. 2e are open as shown in FIG. 2f, and the switches open in FIG. 2e are closed as shown in FIG. 2f, then the polarity of the potential established on the bus conductors will be reversed and the load will "see" this reversed polarity. Accordingly it is evident that the second switching frequency $f_2$ can be utilized concomitantly with the switching pulses at the first frequency $f_1$, to regulate both the frequency and the amplitude of the voltage established on conductors 25, 26.

Figure 3:
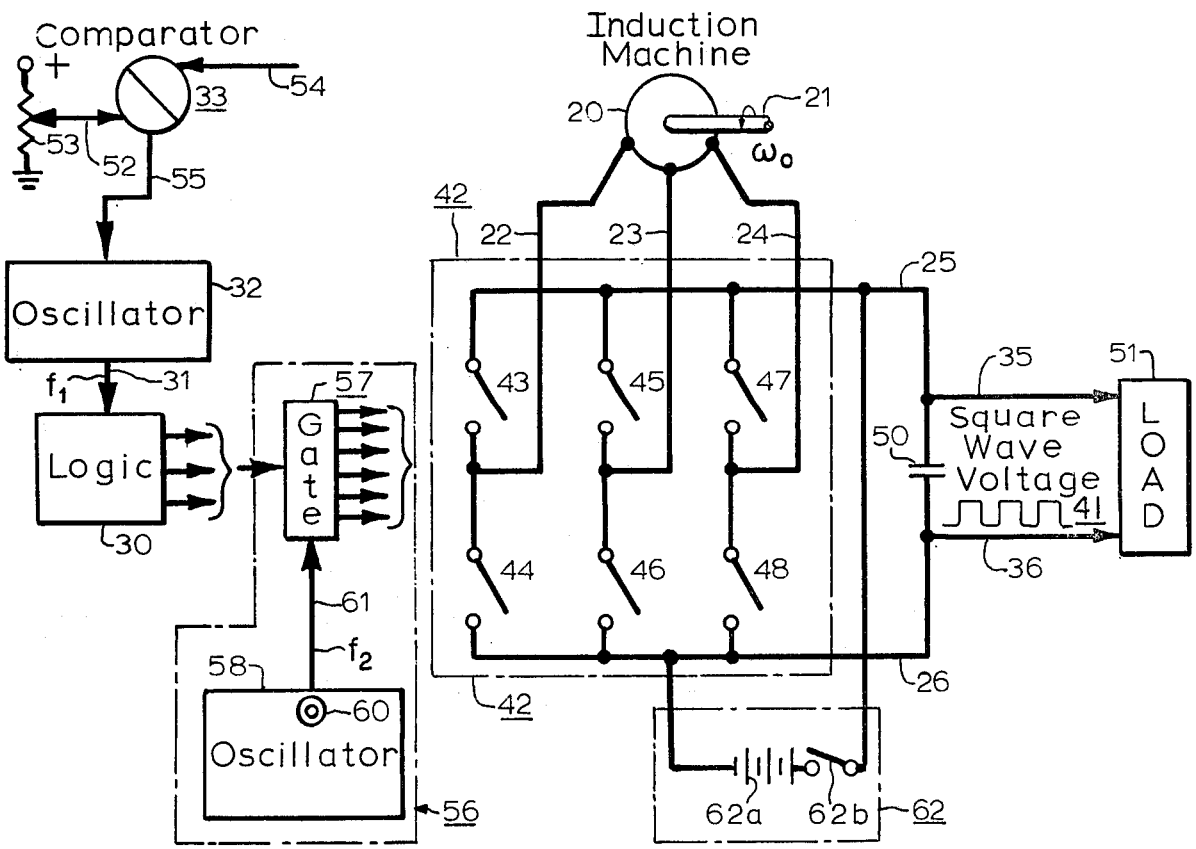
FIG. 3 is a block diagram depicting the system of the present invention.

As shown in FIG. 3, the basic system of the present invention provides a controlled a-c output voltage as represented by the waveform 41 from the conventional bus conductors 25, 26 of a modified switching system or inverter circuit 42. The switches 43-48 within circuit 42 differ from the conventional thyristors or switches $A_1$ - $c_2$ shown in FIG. 1 in that each switch in circuit 42 is a "power switch." This term is used in this specification and the appended claims to indicate a component or circuit arrangement capable of passing current in either direction when turned on by a firing pulse. If thyristors are used for the power switches, then forced commutation must be provided for the thyristors; this commutation is not required when power transistors or other GTO's are employed in the power switches. The normal load connections of switching system 42 are coupled over conductors 22-24 to the output terminals of the induction machine 20, which is driven as before by mechanical input power received over shaft 21. Capacitor 50 in FIG. 3 is designated with a numeral different than that of capacitor 34 in FIG. 1 because it is physically much smaller, and in fact is not necessary to the successful operation of the invention when a three-phase machine 20 is used as shown. If a single-phase induction machine is employed, and one "leg" (such as components 47, 48) of the switching system is removed, the capacitor 50 is necessary. such an arrangement is not the preferred system, because the output voltage waveform on the bus conductors is less desirable. With the prefered three-phase machine shown in FIG. 3, it has been found that the small capacitor 50 helps to smooth the output voltage represented by waveform 41 passed over the normal system bus conductors 25, 26 and the load conductors 35, 36 to energize the a-c load 51, which can be an inductive load such as a motor or any other a-c load effectively energized by a controlled a-c voltage. Start-up circuit 62 depicts a battery 62a and switch 62b, as one means for supplying energy during machine starting. Those skilled in the art will recognize that other means, such as remanent magnetization, or discharge of a capacitor, could also be used for start-up.

The system of FIG. 3 has other components generally similar to that in FIG. 1. In particular, a first logic circuit 30 is connected to supply firing pulses which would normally be used to regulate turn-on of the switches within the inverter circuit 42 at a frequency $f_1$ to provide the proper induction machine electrical frequency and thus regulate the amplitude of the controlled a-c voltage on lines 35, 36. Logic circuit 30 has only three output connections in FIG. 3, for reasons to be explained in connection with FIG. 5. As before this first logic circuit in FIG. 3 is regulated by a first oscillator circuit 32 connected to provide timing pulses at frequency $f_1$ for regulating the logic circuit operation. The showing of FIG. 3 is slightly different in that the arrangement 33 for regulating the oscillator output frequency is shown as an external comparator circuit, for receiving a first or reference input signal over conductor 52 from a reference unit 53 such as a potentiometer, and a second input signal over another conductor 54 from any suitable arrangement, such as a rectifier (not shown) coupled to the output load conductors 35, 36. The output signal for comparator 33 is then applied over conductor 55 to regulate the basic frequency $f_1$ of the pulses supplied by oscillator 32 to control logic circuit 30.

In accordance with the present invention, a second logic circuit 56 is provided, and this second logic circuit includes both a gate circuit 57 and a second oscillator circuit 58. Gate circuit 57 is coupled between first logic circuit 30 and the individual power switches 43-48 within the inverter circuit 42. Second oscillator circuit 58 includes a component 60 adjustable to regulate the phase reversal frequency $f_2$ of the output pulses supplied over line 61 to the gate circuit 57 (thus to regulate the phase reversal, or the frequency of the a-c voltage on lines 35, 36). Gate circuit 57 is thus regulated as a function of the pulses provided not only by the second oscillator circuit 58 at frequency $f_2$ but also the first oscillator circuit 32 at basic frequency $f_1$, through logic circuit 30. As a result the individual firing pulses supplied by gate circuit 57 regulate turn-on of the switches 43-48 in the inverter circuit 42. This particular arrangement provides a controlled a-c voltage on the conventional inverter bus conductors 25, 26 for energizing the a-c load 51.

Those skilled in the art will appreciate that the term "inverter circuit" is used to designate the arrangement shown and identified by numeral 42 in FIG. 3, even though an inverter function is not attained by this switching system. That is, the circuit does not function in the classical fashion to be energized by a d-c potential difference applied between conductors 25, 26 and provide an alternating output voltage on conductors 22, 23 and 24. Instead, an a-c voltage is provided on lines 22-24 as a result of operating induction machine 20, and when properly switched by the operation of the second logic circuit 56 in conjunction with the conventional components 30 and 32, the system is effective to provide an a-c voltage on the bus conductors 25, 26.

DETAILED DESCRIPTION OF THE INVENTION

Figure 4A:
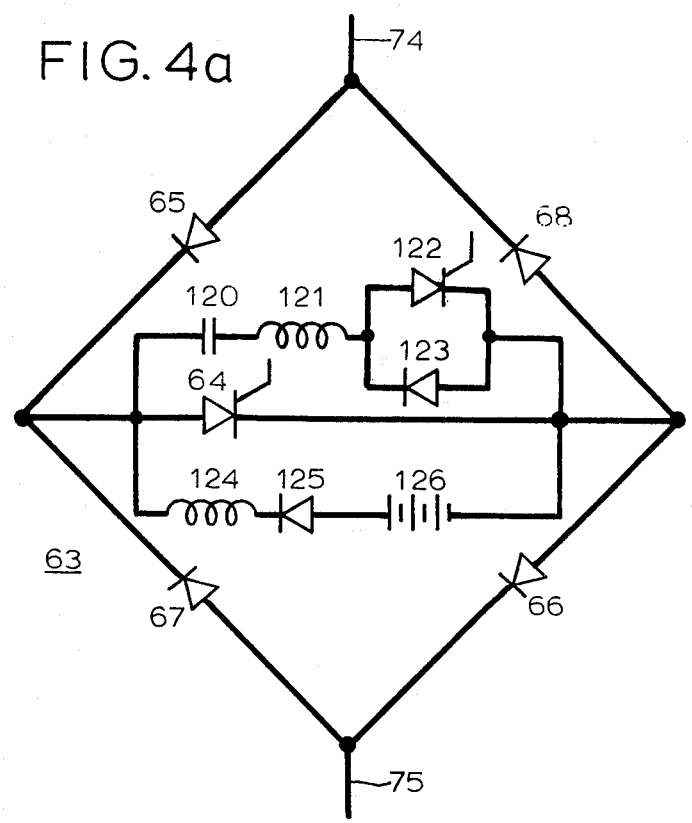
FIGS. 4a, 4b, 4c and 4d are schematic illustrations of various power switches.

There are two major differences between the conventional system of FIG. 1 and the general system arrangement of this invention depicted in FIG. 3. Specifically, each of the power switches 43-48 is a true two-way switch for conducting current in either direction when the switch is closed, as opposed to the conventional thyristors or SCR's represented by the switches $A_1$-$C_2$ in FIG. 1. Each of the power switches 43-48 can be one of various types of individual components or circuit arrangements, some of which are represented in FIGS. 4a-4d. FIG. 4a shows a power switch 63 connected between conductors 74 and 75 to conduct current between these two conductors when the thyristor 64 is gated on, no matter the polarity of the potential difference then applied between conductors 74, 75. Those skilled in that art will readily appreciate that the diode bridge 65-68 in conjunction with the thyristor 64 passes current in either direction when the thyristor 64 is gated on.

In FIG. 4a components 120-126 depict one forced commutation circuit. Before turning on main thyristor 64, thyristor 122 is gated on to charge capacitor 120 from battery 126. When SCR 64 is later turned on, the charge on capacitor 120 is reversed (over 64, 123 and 121). Then, when it is desired to commutate SCR 64, SCR 122 is turned on. This again reverses the charge across 120, preparing the circuit for the next commutation. Other commutation circuits can also be used, and because these are known to those skilled in the art, they need not be shown in connection with FIGS. 4b and 4c.

Figure 4C:
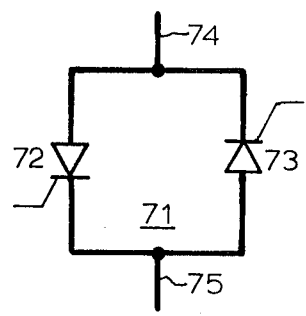
Figure 4D:
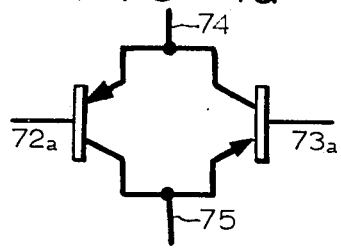
Figure 4B:
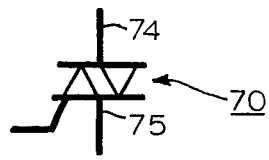

FIG. 4b shows a single component, a triac 70, which passes current in either direction between conductors 74 and 75 when a gate pulse is received and there is a potential difference applied across the conductors. Likewise, FIG. 4c shows a pair of inverse-parallel connected thyristors 72, 73 for conducting current between the conductors 74, 75 when one of the two thyristors is gate on. Those skilled in the art will readily implement suitable commutation circuits for the power switches shown FIGS. 4b and 4c. FIG. 4d depicts a pair of inverse-parallel connected power transistors, which do not require any commutation circuit. Other arrangements for use as the power switches 43-48 will doubtless be suggested to those skilled in the art, but these are illustrated as several means capable of passing current in either direction when turned on by a firing pulse, and capable of being turned off at any time.

The other major difference between the known system of FIG. 1 and the system of this invention depicted in FIG. 3 is the second logic circuit 56, which FIG. 5 illustrates in more detail. In particular, the gate circuit 57 is shown as an exclusive "OR" gate arrangement in FIG. 5. In a normal OR gate, the signal on either input line will appear on the output conductor. If a 1 or high level signal appears on either input line, it will also appear on the output conductor. However with the exclusive OR gate, there is a 1 or high level output signal from the gate when the input signals are different. If both input signals are low (0) or both are high (1), then the output signal will be low (0). If either one of the inputs is low and the other high, the exclusive OR gate will provide a high (1) output signal. Broadly then it is apparent that the input signals on conductors 80, 81 and 82 which would normally pass directly to the driver stages in the manner shown, can be "switched" or inverted by the signal provided on conductor 84.

In FIG. 5 gate signal generator 85 corresponds generally with the conventional logic circuit 30 depicted in FIG. 3. The gate signal generator includes five stages 86-90. NAND stages 86, 87 provide proper starting of the gate signal generator. Three flip-flop stages 88-90 are connected in a conventional ring counter circuit to provide output signals on the conductors 80, 81 and 82 as a function of the timing input signals received over line 91. That is, the pulses received on line 91 are divided down in frequency in a well known manner to provide the individual signals displaced in phase on conductors 80-82. Other ring counter or divide-down arrangements can be used to provide the appropriate signals on lines 80-82.

Delay stage 92 is provided to prevent spurious or inaccurate triggering in the exclusive OR gate 57 should a transition in the timing signal on any of lines 80, 81 or 82 occur substantially concomitantly with a transition or switching in the signal on line 84. To this end the delay stage 92 includes two separate time delay stages 93 and 94, effective to provide different duration time delays. Using T as the normal turn-off time of any power switch 43-48, or the thyristor component in the power switch, stage 93 provides a delay of 2T and stage provides a delay of 4T. Thus the timing pulses at frequency $f_1$ received on line 31 from the conventional oscillator are delayed in stage 93 and then, after this predetermined time delay, passed over line 91 to the ring counter within gate signal generator 85. After the delay in stage 94, the pulses delayed substantially longer (by the time 4T) are passed over line 95 to one input connection of a latch circuit 96, including the conventionally connected logic stages 97, 98, 99 and 100. The other input signals for the latch circuit are provided over line 61 to a divide-by-two counter 101, which in its turn provides output signals at a frequency $f_2$ on lines 102 and 103 for the latch circuit. In addition, conductor 104 provides a feedback connection to the divide-by-two circuit as shown, and a reset signal is provided on line 105. Those skilled in the art will appreciate that the divide-by-two circuit is used to provide a 50% duty cycle of the output a-c voltage, and thereby produce a square wave, regardless of the pulse width of the signal on line 61. In addition stage 61 provides complementary output signals for application to the latch circuit. The output of the latch circuit is prevented from interfering with the signals on lines 80-82 by reason of the extended delay of 4T in stage 94 as contrasted with the delay of 2T in stage 93.

The invention has been described in connection with a system for delivering a controlled a-c voltage to a load. Use of divide-by-two circuit provides a 50% duty cycle, and hence a square wave output voltage on the bus conductors. However the output voltage need not be a square wave, but pulse width modulation can be provided with appropriate circuits in second logic circuit 56. Those skilled in the art can readily implement such an arrangement, without any further explanation.

The output signals from the exclusive OR gate 57 are inverted in the respective inverter stages 106, 107 and 108 to provide signals on lines 110, 111 and 112 which are inverted in polarity with respect to those on the lines 113, 114 and 115. Because the six turn-on signals are developed from the three signals provided on the output side of exclusive OR gate 57, only three gating signals (on lines 80-82) need be provided by the ring counter in gate signal generator 85. The resulting six turn-on signals are then passed over the amplifier stages shown to regulate operation of the power switches 43-48 in the well known manner.

In general the switching system used to excite the induction generator is shown as a bridge inverter configuration, but other arrangements can be used. For example, FIG. 6 depicts a load 150 having one side coupled to the center-tapped connection of an induction generator winding 151, 152. The power switches 153, 154 have their common connection coupled to the other side of the load 150, and their other connections are effectively coupled to the other ends of the winding 151, 152. A filter capacitor 155 is shown coupled across the load.

Assuming the voltage across the windings is that shown by the polarity signs, it is apparent that closure of switch 153 will provide a voltage of a given polarity across load 150, but if this switch is opened and 154 is closed, the voltage across load 150 will be opposite that given polarity. Hence the term "switching system" embraces not only bridge inverter circuits but other arrangements such as that depicted in FIG. 6 for effecting the phase reversal across a load upon the selective closure of a given switch or switches.

Figure 7:
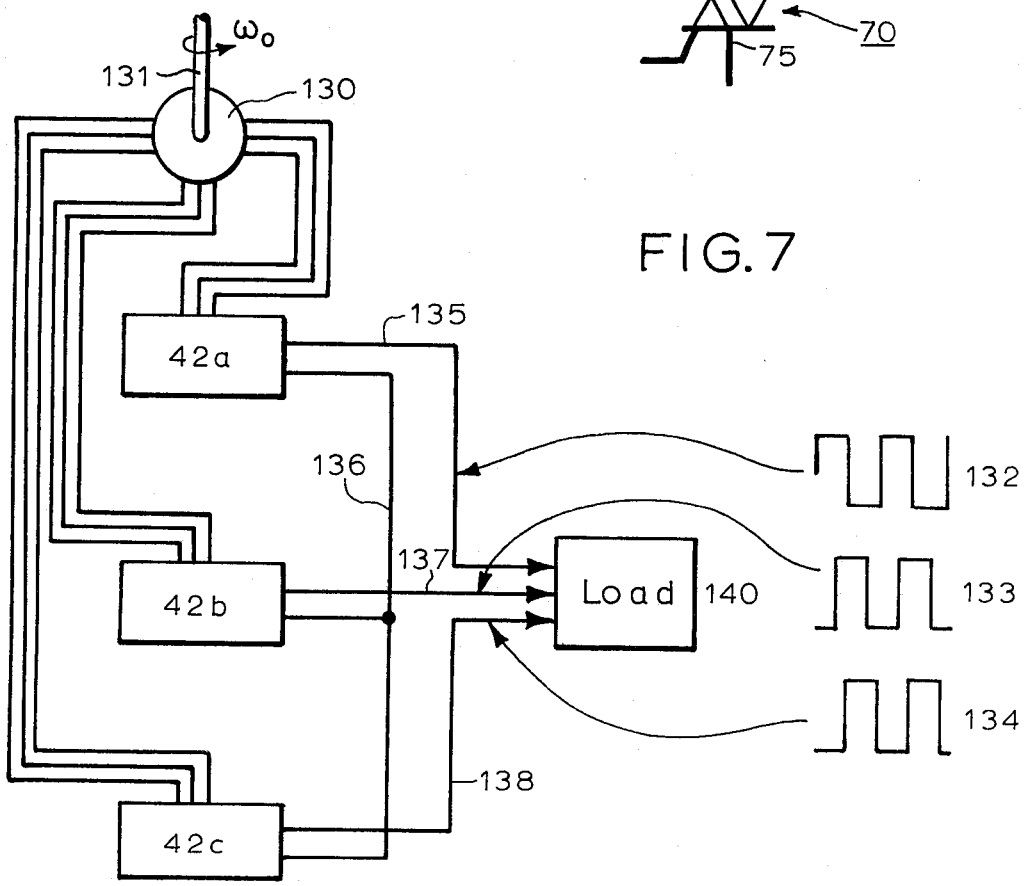
FIG. 7 is a partial block diagram showing another embodiment of the invention.

FIG. 7 depicts a different system embodiment, utilizing the basic principles of the present invention. Three separate switching systems 42a, 42b and 42c are shown in place of the single switching system or inverter circuit 42 shown in FIG. 3. In the system of FIG. 7 the conventional induction machine 20 is replaced by a machine 130 with multiple windings, preferably bifilar or closely wound windings to provide in effect three separate sets of connections as shown in FIG. 7. Each of these sets of output terminals is then coupled to the input side of one of the switching systems 42a, 42b and 42c. Of course the logic circuit is modified to trigger the inverter system 42a, 42b and 42c to switch at 120° intervals, to produce the three separate voltages represented by the wave forms 132, 133 and 134. The output voltage represented by 132 appears between conductors 135 and 136. Similarly the second voltage 133 appears between conductors 138 and 136. As shown conductor 136 is common to the output circuits of each of the switching systems, and conductor 136 could be extended if a four wire a-c system is required. As shown the voltages applied over conductors 135, 137 and 138 are used to energize a three-phase load 140, providing quasi-square wave operation. In this manner the basic square wave switching arrangement depicted in FIG. 3 can be multiplied to produce, in effect, the energization of an a-c load 140 by a three-wire system.

When used with a three-phase machine as shown in FIG. 3, the system of this invention provides very good voltage control of the level of the output controlled a-c voltage on conductors 25, 26 over a very wide speed range of the machine 20.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled."

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. The method of controlling an a-c voltage generating system in which an induction machine is driven as a generator, comprising the steps of:
    exciting the generator from a switching system including a plurality of controllable switches and a pair of bus conductors;
    regulating the frequency of operation of the switches in accordance with a first frequency $f_1$, to regulate the amplitude of a d-c voltage established on the bus conductors; and
    additionally regulating the operation of the switches in accordance with a second frequency $f_2$ and in a pattern such that the output voltage on the bus conductors is effectively reversed each time the switches are operated in accordance with the frequency $f_2$, thus providing on the bus conductors an alternating voltage the frequency of which is controllable independently of the induction generator speed.

2. An a-c voltage generating system including an induction machine coupled to a switching system having a pair of bus conductors and a plurality of switches, a first logic circuit connected to supply firing pulses to regulate operation of the system switches, and a first oscillator circuit connected to provide timing pulses at a first frequency $f_1$ for regulating operating of the first logic circuit, characterized in that:
    each switch in the switching system is a power switch, capable of passing current in either direction when turned on by a firing pulse and capable of being turned off at any time; and further comprising
    a second logic circuit, including a gate circuit coupled between said first logic circuit and said power switches, and a second oscillator circuit, coupled to said gate circuit, the gate circuit being connected to operate as a function of the pulses provided by both the first and second oscillator circuits, to turn on the power switches in the inverter circuit in accordance with the operating frequencies of both the first and second oscillator circuits, to provide a controlled a-c output voltage on the inverter bus conductors.

3. An a-c voltage generating system as claimed in claim 2, in which said gate circuit comprises three exclusive OR gates connected to provide said firing pulses for the power switches as a function of signals received from both the first and the second oscillator circuits.

4. An a-c voltage generating system as claimed in claim 2, in which said first logic circuit includes a gate signal generator, with a plurality of flip-flops connected in a ring counter circuit to provide a plurality of output signals for application to said gate circuit.

5. An a-c voltage generating system as claimed in claim 4, and further comprising a delay stage including two delay circuits, each of which delay circuits has its input portion connected to receive the same timing pulses from the first oscillator circuit, said first delay circuit being connected to provide a predetermined time delay and then pass the time-delayed timing pulses to said gate signal generator, said second delay circuit being connected to provide a delay substantially longer than said predetermined time delay of the first delay circuit and then pass the longer-delayed pulses to the gate circuit, thus precluding inadvertent switching of the gate circuit by pulses which might otherwise be received virtually simultaneously from both the first and the second oscillator circuits.

6. An a-c voltage generating system as claimed in claim 5, and further comprising a latch circuit coupled between the second delay circuit and the gate circuit, and a divide-by-two circuit coupled between the second oscillator and the input side of the latch circuit, to provide a square wave output voltage with 50% duty cycle on the inverter bus conductors.

7. An a-c voltage generating system including a three-phase induction machine coupled to a three-phase switching system having a pair of bus conductors and six power switches, each switch being capable of passing current in either direction when turned on by a firing pulse and capable of being turned off at any time, a first logic circuit connected to supply firing pulses to regulate turn-on of the power switches, and a first oscillator circuit connected to provide timing pulses for regulating operation of the first logic circuit at a first frequency $f_1$ to regulate the amplitude of the output voltage provided on the bus conductors, characterized by:
    a second logic circuit, including an exclusive OR gate circuit coupled between said first logic circuit and said power switches, and a second oscillator circuit, coupled to said gate circuit and connected for operation at a second frequency $f_2$ to regulate the frequency of the output voltage provided on the bus conductors, the gate circuit being connected to operate as a function of the pulses provided by both the first and second oscillator circuits, to turn on the power switches in the inverter circuit in accordance with the operating frequencies of both the first and second oscillator circuits and provide a controlled a-c output voltage on the inverter bus conductors.

8. An a-c voltage generating system as claimed in claim 7, in which said first logic circuit includes a gate signal generator, with a plurality of flip-flops connected in a ring counter circuit to provide a plurality of outputs signals for application to said exclusive OR gate circuit.

9. An a-c voltage generating system as claimed in claim 8, and further comprising a delay stage including two delay circuits, each of which delay circuits has its input portion connected to receive the timing pulses from the first oscillator circuit, said first delay circuit being connected to provide a predetermined time delay and then pass the time-delayed timing pulses to said gate signal generator, said second delay circuit being connected to provide a delay substantially longer than said predetermined time delay of the first delay circuit and then pass the longer-delayed pulses to the exclusive OR gate circuit, thus obviating inadvertent switching of the exclusive OR gate circuit by pulses which might otherwise be received virtually simultaneously from both the first and the second oscillator circuits.

10. An a-c voltage generating system as claimed in claim 9, and further comprising a latch circuit coupled between the second delay circuit and the gate circuit, and a divide-by-two circuit coupled between the second oscillator and the input side of the latch circuit, to provide on the inverter bus conductors a square wave output voltage with a 50% duty cycle.

11. An a-c voltage generating system as claimed in claim 7, and in which first oscillator circuit includes means to adjust the frequency $f_1$ of the timing pulses supplied by the first oscillator circuit to effect a corresponding adjustment in the amplitude of the controlled a-c output voltage on the bus conductors, and the second oscillator circuit includes means to adjust the frequency $f_2$ of the timing pulses supplied by the second oscillator circuit to effect a corresponding adjustment in the frequency of the controlled a-c output voltage on the bus conductors.

12. A multi-phase a-c voltage generating system, including:
a multi-purpose induction machine, having a plurality of closely wound windings for each phase circuit and a corresponding plurality of output connections for each phase circuit;
a plurality of switching systems, each having a set of input connections coupled to one phase circuit set of the induction machine output connections and each having a pair of output connections;
means connected to regulate operation of each switching system at a first frequency $f_1$, to regulate the amplitude of the voltage provided at the output connections of each switching system;
means connected to regulate operation of each switching system at a second frequency $f_2$, to regulate the frequency of the control a-c voltage thus established at the output connections of each switching system; and
a plurality of output conductors, respectively coupled with the output connections of the individual switching systems, for combining the individual controlled a-c voltages into a multi-phase a-c output voltage.

* * * * *

UNITED STATES PATENT OFFICE
CERTIFICATE OF CORRECTION

PATENT NO. : 3,982,170
DATED : September 21, 1976
INVENTOR(S) : David James Gritter
George Henry Studtmann It is certified that error appears in the above-identified patent and that said Letters Patent are hereby corrected as shown below:

Column 9, line 54, change "operating" to -- operation --.

Column 12, line 7, change "multi-purpose" to -- multi-phase --.

Signed and Sealed this

Twenty-third Day of November 1976

[SEAL]

Attest:

RUTH C. MASON
Attesting Officer

C. MARSHALL DANN
Commissioner of Patents and Trademarks